Apr. 17, 1923. 1,452,374
K. P. GOTTSCHALK
APPARATUS FOR IMPREGNATING MATCHES OF WOOD, PASTEBOARD, PAPER,
OR THE LIKE WITH PARAFFIN
Filed March 25, 1922
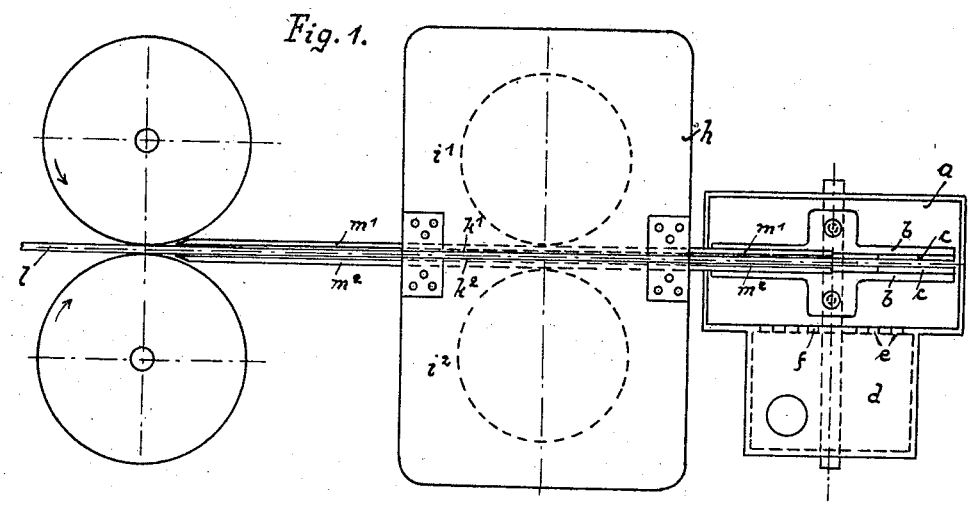
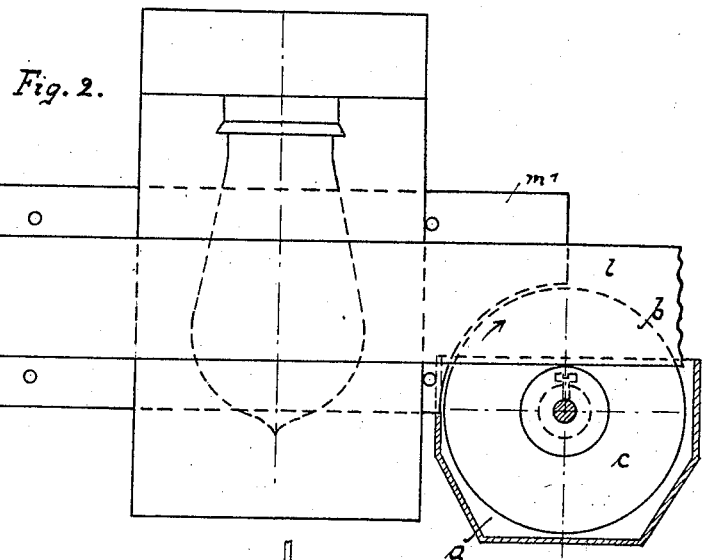
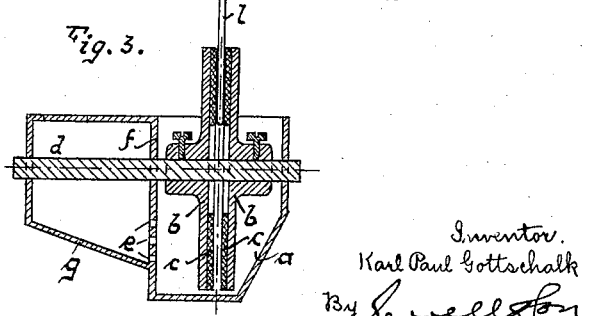
Inventor.
Karl Paul Gottschalk
By [signature]
his attorneys.

Patented Apr. 17, 1923.

1,452,374

UNITED STATES PATENT OFFICE.

KARL PAUL GOTTSCHALK, OF DRESDEN, GERMANY, ASSIGNOR TO HENRY STAIER, OF GRUNAU, NEAR ROSSWEIN, SAXONY, GERMANY.

APPARATUS FOR IMPREGNATING MATCHES OF WOOD, PASTEBOARD, PAPER, OR THE LIKE WITH PARAFFIN.

Application filed March 25, 1922. Serial No. 546,944.

*To all whom it may concern:*

Be it known that I, KARL PAUL GOTTSCHALK, engineer, a subject of the Republic of Saxony, German Republic, and resident of 19 Reickerstrasse, Dresden, Republic of Saxony, German Republic, have invented a new and useful Apparatus for Impregnating Matches of Wood, Pasteboard, Paper, or the like with Paraffin, of which the following is a specification.

The present invention has for its object an apparatus for impregnating matches of wood, pasteboard, paper or the like with paraffin. The novelty of said apparatus consists in that two discs vertically rotating within a receptacle filled with paraffin and heated in a convenient manner are coated on their inner surfaces with felt or another material absorbing the paraffin in such a manner that during the rotary movement of the discs and their passage through the liquid paraffin the latter is absorbed by the felt which supplies the paraffin for the purpose of impregnation to the wood, pasteboard or paper band or stripe passing at the top between the two discs and forming the matches. The discs coated with felt on their inner facing sides are arranged at a defined distance from each other and can be adjusted one to another.

A supply-container is arranged at the side of the receptacle and used for heating and supplying the latter with fresh liquid paraffin. The receptacle and the container are separated one from another by a partition provided in its lower part with openings by which the receptacle is connected with the container in such a manner that a preliminary heating of the paraffin within the container on the one hand and a supply of fluid paraffin to the receptacle on the other hand is ensured by the supply of liquid paraffin into the container heated in any convenient manner. The container is provided with a bottom slanting towards the receptacle for ensuring a complete emptying of the container and a continuous supply of liquid paraffin to the receptacle from said container.

For the purpose of ensuring an easier transfer of the paraffin from the felt or any other absorbing material onto the matches formed of wood, pasteboard, paper or the like with an impregnating-apparatus arranged according to the present invention, a device for preliminarily warming the material to be heated is arranged in front of said impregnating-apparatus. Said device consists of heated plates or the like between which the matches are passed and preliminarily heated in such a manner that the matches are able to easily absorb the paraffin from the felt.

In the accompanying drawing, Fig. 1 is a plan and Fig. 2 a longitudinal section of a structure showing my improvement embodied in one form in an impregnating-apparatus. Fig. 3 is a vertical section of the impregnating device of the apparatus mentioned.

In the said drawing, $a$ is the receptacle, $b\ b$ are two discs rotatably arranged on a horizontal shaft in a defined distance and adjustable one towards another and $c$ is a layer coating the inner side or surface of said discs and consisting of felt or other suitable absorbing material. $d$ is a container being in connection with the receptacle $a$ by openings $e$ provided in the lower part of a partition $f$ in such a manner that the receptacle $a$ is constantly filled with liquid paraffin on supplying the container $d$ with fresh or liquid paraffin. $g$ is a bottom closing the lower part of the container $d$ and slanting towards the receptacle $a$ so as to ensure a continuous supply to the receptacle. The receptacle $a$ and the container $d$ are heated in a suitable manner whereby the paraffin of the container is preliminarily warmed and kept in a fused state in said container and in the receptacle.

$h$ is a device arranged in front of the impregnating apparatus proper and used for preliminarily heating or warming the match-band to be impregnated. Said device can be formed by two heated boxes $i^1\ i^2$ provided with walls $k^1\ k^2$ facing one another between which the match-band $l$ can be passed. In case of necessity, two guide-plates $m^1\ m^2$ situated at the inner wall of the heated boxes may be arranged, said plates being heated by the boxes $i^1\ i^2$ and transmitting their heat to the match-band running along the guide-plates, so that this match-band is in contact with the heating-device for a longer period and a better preliminary heating of said band is ensured.

What I claim is:

1. In an apparatus for impregnating matches of wood, pasteboard, paper or the like with paraffin, in combination with a receptacle filled with paraffin, of discs rotating within said receptacle, arranged in a defined distance from each other and adjustable one towards another and layers of absorbing material coating the inner facing surfaces of said discs and transmitting the paraffin to the match-band passed between the upper parts of the discs mentioned.

2. In an apparatus for impregnating matches of wood, pasteboard, paper or the like with paraffin, in combination with a receptacle filled with paraffin to be heated, of felt-coated discs rotating within said receptacle, a heated paraffin-container for preliminarily heating the paraffin, a partition situated between the receptacle and container mentioned, openings provided in said partition to ensure the continuous supply of the fused paraffin from said heated container into the receptacle.

3. In an apparatus for impregnating matches of wood, pasteboard, paper or the like with paraffin, in combination with a heated receptacle filled with paraffin of felt-coated discs rotating within said receptacle, a heated paraffin-container, a device for preliminarily heating the match-band situated in front of the impregnating apparatus proper, a partition provided with openings and situated between the receptacle and the container, so as to ensure a continuous supply of fused paraffin from the container into the receptacle mentioned.

4. In an apparatus for impregnating matches of wood, pasteboard, paper or the like with paraffin, in combination with a heated-paraffin-receptacle of felt-coated discs rotating within said receptacle, a heated paraffin container, for preliminarily heating the paraffin a device for preliminarily heating the match-band situated in front of the impregnating-apparatus proper and consisting of heated boxes for passing the match-band between the inner walls of the boxes is passed a partition provided with openings and situated between the receptacle and the container, so as to ensure a continuously supply of liquid or fused paraffin from the container into the receptacle mentioned.

5. In an apparatus for impregnating matches of wood, pasteboard, paper or the like with paraffin, in combination with a heated paraffin-receptacle, of felt coated discs rotating within said receptacle, a heated paraffin-container for preliminarily heating the paraffin a device for preliminarily heating the match-band situated in front of the impregnating-apparatus proper and consisting of heated boxes for passing the match-band between the inner walls of the boxes is passed, guide plates fastened to said boxes and directly heated by them for conducting the match-band between the plates mentioned, a partition provided with openings and situated between the receptacle and the container so as to ensure continuous supply of fused paraffin from the container into the receptacle mentioned.

In testimony, that I claim the foregoing as my invention I have signed my name this 15th day of February, 1922.

KARL PAUL GOTTSCHALK.